United States Patent [19]

Yamagiwa et al.

[11] Patent Number: 4,609,947
[45] Date of Patent: Sep. 2, 1986

[54] VIDEO SIGNAL RECORDING APPARATUS

[75] Inventors: Kazuo Yamagiwa, Tokyo; Kiyoshi Nishitani, Fujisawa; Koichi Takeuchi, Kamakura; Seiji Sato, Yokohama, all of Japan

[73] Assignee: Sony Corporation, Tokyo, Japan

[21] Appl. No.: 526,062

[22] Filed: Aug. 24, 1983

[30] Foreign Application Priority Data

Aug. 25, 1982 [JP] Japan ................................ 57-147337

[51] Int. Cl.$^4$ ...................... H04N 9/491; H04N 5/78; G11B 5/52
[52] U.S. Cl. .................................. 358/310; 358/906; 360/9.1; 360/84
[58] Field of Search ....................... 358/310, 319, 906; 360/8, 9.1, 84, 85, 107, 10.3

[56] References Cited

U.S. PATENT DOCUMENTS 4,358,799 11/1982 deNiet .................................. 360/84
4,405,955 9/1983 Kaima et al. ...................... 360/10.3
4,510,538 4/1985 Sato et al. .............................. 360/84

FOREIGN PATENT DOCUMENTS 124409 10/1978 Japan .

Primary Examiner—Aristotelis M. Psitos
Attorney, Agent, or Firm—Lewis H. Eslinger; Alvin Sinderbrand

[57] ABSTRACT

A video signal recording apparatus of reduced size for portability combines a video camera and helical scan video tape recorder in a single unit, in which the reduced size is obtained in part by having a tape guide drum of reduced diameter, which requires a tape wrap angle greater than the conventional 180° and employs a pair of rotary tape heads that are arranged close together relative to the diametrically opposed conventional head arrangement. The timing of the heads in recording the fields of the video signals as tracks is controlled by a vertical synchronization signal having pulses that are delayed to account for the finite distance between the two rotary heads. The vertical sync signal then has a different time period for a first field than it does for a second field of one frame of the video signal. The camera has an image pickup portion that is caused to be scanned by the same synchronization signals utilized in the recording operation. This permits any horizontal overscan to occur at a time when the heads are off the tape and by adjusting the time base of the vertical sync signal the overscan can be arranged so that the portion of it is above and below the effective portion of the image pickup portion of the camera.

28 Claims, 20 Drawing Figures

PRIOR ART

VIDEO SIGNAL RECORDING APPARATUS

BACKGROUND OF THE INVENTION

1. Field of the Invention

The present invention relates in general to apparatus for recording a video signal and, particularly, to portable apparatus having an image sensor, signal processor, and recorder that may be utilized as a recording video camera.

2. Description of the Prior Art

Video tape recorders (VTR) for home use are now very popular, and these video tape recorders employ a magnetic tape wrapped around a tape guide drum at a specified wrap angle that is slightly greater than 180° and which defines a corresponding circumferential distance around the drum. Two rotary heads, which are spaced 180° apart on the guide drum, are rotated at a known frame frequency and the rotary heads alternately contact the magnetic tape that is being driven at a fixed speed. A video signal to be recorded is fed to the head that is in contact with the tape. In a typical video tape recorder, the fields of a video signal are recorded as obliquely on the magnetic tape. In order to reproduce the video signal this series of tracks, each containing one video field, are scanned by two rotary heads, which are the same as those used in the recording mode.

In a conventional video tape recorder intended for home use, the same unit is used to record as well as to reproduce video signals, however, it has become evident that a very useful piece of equipment would be a portable television camera integrated with a small, light-weight video tape recorder. This unit could be used to make video recordings at remote locations for subsequent playback by the main video tape recorder and, thus, would not require playback circuitry. In order to produce such an integrated camera/recorder, the mechanical aspects of the video tape recorder must be substantially miniaturized, in relation to the recorder used in the main playback and record unit. One of the critical features of such miniaturization is that the tape guide drum and the head mechanism in the tape guide path must be made substantially smaller than in the typical non-portable video tape recorder intended for home use, and this requires reducing the diameter of the tape guide drum. Nevertheless, simply reducing the diameter of the tape guide drum results in a pattern of tracks on the magnetic tape that does not coincide with the track pattern produced by a standard video tape recorder, and this presents problems during reproduction because the tape is to be played back using a standard diameter tape guide drum. The video track length, angle, and pitch have been standardized among all video tape recorders using the same format.

One approach to having the portable television camera recorder produce the same pattern of video tracks on the magnetic tape when using a substantially smaller diameter drum than standard is to wrap the magnetic tape around the drum for a larger circumferential extent (greater wrap angle) than that used in the conventional video tape recorder. The greater wrap angle in relation to the smaller diameter tape guide drum will provide an equivalent length of time for the head to contact the tape, thus, permitting a track of the same length to be laid down, but if the two heads remain spaced apart by 180°, then there will be a substantial time period before the second head is in position to commence recording after the first head has laid down its track. This relatively long time delay between tracks is to be avoided. One apparent approach to dealing with an increased wrap angle would be to scan the video tape with a single head, however, to record a video signal with the presently required high density it is necessary that the parallel tracks be formed abutting one another, with no space or guard band in between. This close arrangement of the tracks results in crosstalk during playback, and the best way of eliminating such crosstalk is to use two recording/playback heads with different azimuth gap angles. In this way, the azimuth loss of the reproduced crosstalk signal will render the adverse effects of such crosstalk signal insignificant. Thus, two heads are necessary to successfully record a video signal with high density. An ideal approach to this requirement would be to use two heads, both arranged at the same location, but since there must be some finite distance between the heads this prevents use of this ideal solution to the problem.

In typical color video cameras that are intended to cooperate with a video tape recorder, the output signal of the color video camera is encoded into a composite color video signal, and at the time it is to be recorded by the video tape recorder this composite color video signal is separated into a luminance signal and a color carrier (chrominance) signal. Typically, the luminance signal is FM modulated, and the color carrier signal is frequency down-converted to a frequency that is lower than the lower carrier frequency of the composite signal. Thus, to obtain the required video signal an encoder is required and a substantial amount of filtering and frequency conversion is also necessary to obtain the appropriate signal. All of this filtering and frequency converting deteriorates the frequency and phase characteristics of the color signal and results in degraded signal quality, as well as the side effect of producing spurious signals.

OBJECTS AND SUMMARY OF THE INVENTION

Accordingly, it is an object of the present invention to provide a video signal recording apparatus having a reduced diameter tape guide drum that can produce the same recording patterns on a magnetic tape as a standard video tape recorder and can be played back by such standard video tape recorder utilizing a standard diameter tape guide drum and two rotary heads spaced apart by an angle of 180°.

Another object of the present invention is to provide a video signal recording apparatus in which an image pickup tube of a color television camera can scan in the interlaced mode and video signal recording is accomplished using a reduced diameter tape guide drum and two, closely-spaced heads.

A further object of the present invention is to provide a combination color video camera and video tape recorder integrally formed as a unit with the output signal of the color video camera directly available for use by the video tape recorder, in which the circuit construction is simple in relation to known circuits and in which the color video signal is not degraded.

In one aspect, the present invention provides a reduced diameter tape guide drum around which the tape is wound with a wrap angle substantially greater than 180°. The actual extent of the wrap angle is related to the number of scan lines in a video frame, either in the NTSC system or in the CCIR system. Two tape heads are provided in proximity, and the heads are provided with different azimuth gap angles to reduce crosstalk between adjacent tracks. The distance between the two heads is translated into an angle that is a function of the horizontal scan time. Because the two heads are positioned close together, there will exist a time when both heads are off the tape and, specifically, following the conclusion of the recording operation by the first head the second head will not yet in position to commence recording. The present invention solves this problem by providing a system in which the time base is adjusted so that the second head will not be enabled to produce a track until it is actually on contact with the tape. This requires a sync pulse time delay in relation to the enablement of the first head, with the extent of the delay based upon the wrap angle and the horizontal scan frequency. By adjusting the time of occurrence of the pulses in the vertical synchronization signal on an alternate field basis, the time base of the signals applied to the tape is altered, and the entire video frame can be applied in the proper time, even though the drum diameter is substantially reduced and there is a finite distance between the two rotary recording heads.

An aspect of the present invention also involves a video camera having an image pickup device and a recording system employing the reduced diameter drum and the specially arranged heads as described above, in which the video camera produces the chrominance signal and the luminance signal in the proper form for recording with no additional encoding and filtering required.

The above and other objects, features, and advantages of the present invention will be apparent from the following detailed description of an illustrated embodiment, which is to be read in connection with the accompanying drawings, in which the same reference numerals identify the corresponding elements and parts in the several views.

DESCRIPTION OF PREFERRED EMBODIMENTS

In determining the wrap angle of the tape around the tape guide path according to the present invention a certain relationship is established between the video format being employed and the wrap angle. For example, in the NTSC system the wrap angle $\theta$ is selected so that:

$$(360°/\theta) \times (525/2) = N \tag{1}$$

or $$(360°/\theta) \times (525/2) = N' + 0.5 \tag{2}$$

In which both N and N' are integers. Similarly, for video signals in the CCIR system the following relationships must also be established.

$$(360°/\theta) \times (625/2) = M \tag{3}$$

or $$(360°/\theta) \times (625/2) = M' + 0.5 \tag{4}$$

Again, where M and M' must both be integers.

When both expressions (1) and (3), with respect to the wrap angle $\theta$, are N and M, respectively, there is an angular distance $\alpha$ between the gaps of the two rotary heads that must be selected in order to cause a time difference between the respective heads given by $(m+0.5)T$, in which m is an integer and T is a time period corresponding to one horizontal scan period.

Similarly, when both expressions with respect to the wrap angle $\theta$ are equal to $(N'+0.5)$ and $(M'+0.5)$, respectively, the angular distance $\alpha$ between the two rotary heads is selected in order to produce a time difference given by mT.

Figure 1:
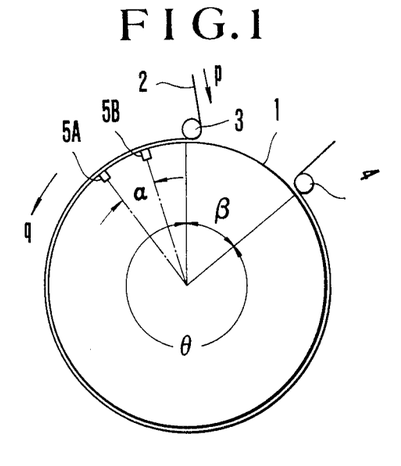
FIG. 1 is a schematic representation of a reduced diameter tape guide drum in a video tape recorder showing the tape wrap angle and the arrangement of the rotary heads according to the present invention.

FIG. 1 is a representation of a tape guide drum 1 having a magnetic tape 2 wrapped around a portion of the circumference thereof with a wrap angle $\theta$ that is greater than 270° but less than 360°. The magnetic tape 2 is wrapped in a slanted or helical fashion around the circumferential surface of the tape guide drum 1, and the tape 2 is driven in the direction indicated by arrow p at a fixed speed, for example, 20 mm/sec. Tape guide members 3 and 4 provide the appropriate wrap of the tape 2 around the tape guide drum 1 and, in that regard, the tape is fed in at tape guide 3 and around the drum 1 so that tape guide 4 functions as the exit guide for the tape. In the embodiment the reduced diameter tape guide drum 1 has a diameter that is 3/5 of a standard diameter drum.

An ideal situation would be to use a 360° wrap angle around the reduced diameter drum and to utilize a single magnetic recording head, however, due to the requirement for high density recording and the problems caused by adjacent track crosstalk, two heads must be used. The two rotary heads are shown in FIG. 1 at 5A and 5B, and these heads sequentially contact the magnetic tape 2 that is wrapped around tape guide drum 1. Rotary heads 5A and 5B are rotated in a counterclockwise fashion in the direction indicated by arrow q at a normal field frequency that is 1/60 sec. for the NTSC format and 1/50 sec. for the CCIR format. As in the conventional video tape recorder, tape guide drum 1 is formed of fixed upper and lower drums and a cylindrical head disc (not shown) is adapted for rotation therebetween. The rotary heads 5A and 5B then protrude through respective windows (not shown) formed in the head disc.

Figure 2:
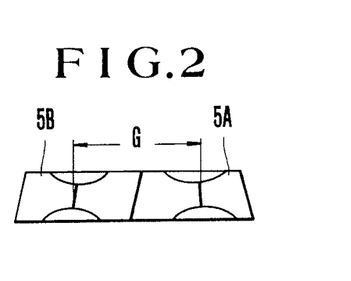
FIG. 2 is a front elevation of the two rotary heads.

The gaps in rotary heads 5A and 5B are oriented to extend in directions which are not parallel, that is, they have different azimuth angles so that, upon reproduction of the recorded tracks, crosstalk components generated from adjacent tracks will be suppressed due to azimuth loss. The orientation of the gaps of heads 5A and 5B, respectively, is seen in FIG. 2. The rotary heads 5A and 5B are arranged at locations spaced apart by a linear distance G, which is represented by an angular distance $\alpha$ in FIG. 1, and such distance is present only because the heads cannot both occupy the same location on the head disc. In one embodiment, the present invention advantageously employs a single, double-azimuth head. Nevertheless, while this inter-gap distance does cause a problem because the second head is not yet in contact with the tape at the time the second field is due to be recorded, the present invention turns this problem into an advantage by specifically selecting this inter-gap distance to be a function of the synchronization signal timing. In the embodiment of FIG. 1, the angular distance $\alpha$ is selected so that the signal track produced by rotary head 5B will be delayed from the time corresponding to the beginning of the second field of the frame by a time period of 1.5T, T indicates the time corresponding to one horizontal period modified in accordance with the specific wrap angle as follows.

$$f_H' = (360°/\theta) \times f_H \quad (5)$$

$$T = 1/f_H' \quad (6)$$

Where $f_H$ represents a standard horizontal scan frequency in either the NTSC of CCIR system format.

Referring then to FIG. 2 one construction of heads 5A and 5B is shown and, because it is desirable to have the heads as close together as possible, the heads are adhered one to another to form a single, double azimuth head, with a distance G between the mid points of the respective gaps. This distance G is a fixed value which correlates to the angular displacement $\alpha$.

Figure 3:
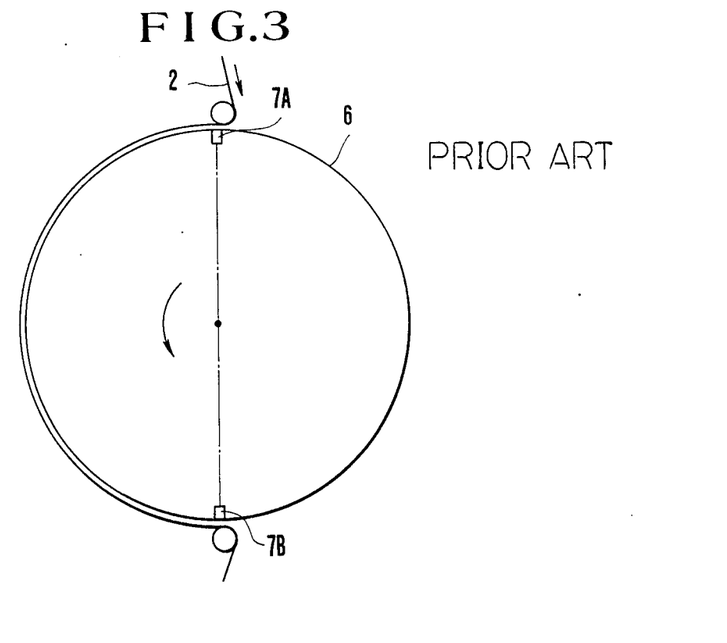
FIG. 3 is a schematic representation of a tape guide drum for a video tape recorder with the rotary heads spaced 180° apart, as known in the prior art.

FIG. 3 represents a rotary head arrangement of a typical video tape recorder of the helical scan kind, which can be used to reproduce video signals that have been already recorded. It is the intent of the present invention to provide a portable video signal recording apparatus to record video signals on a magnetic tape, which can be subsequently reproduced using the standard diameter drum and diametrically opposed head implementation of FIG. 3. More specifically, a conventional diameter tape guide drum 6 has magnetic tape 2 wrapped around its circumferential surface in a helical fashion, with a wrap angle of only slightly greater than 180°. Two rotary heads 7A and 7B are spaced apart by an angle of 180° and, thus, are diametrically opposed. In operation, the heads are adapted to alternately come into contact with the magnetic tape 2 so as to lay down respective, adjacent recorded tracks on the tape. The angles of the respective gaps of rotary heads 7A and 7B coincide with those of the corresponding rotary heads 5A and 5B, as shown in FIG. 2. Reproducing heads 7A and 7B are rotated at the field frequency, so that each reproduces one field of a color video signal. The linear speed of the magnetic tape 2 is standard and is the same as the speed of the tape in the embodiment of FIG. 1.

Figure 4:
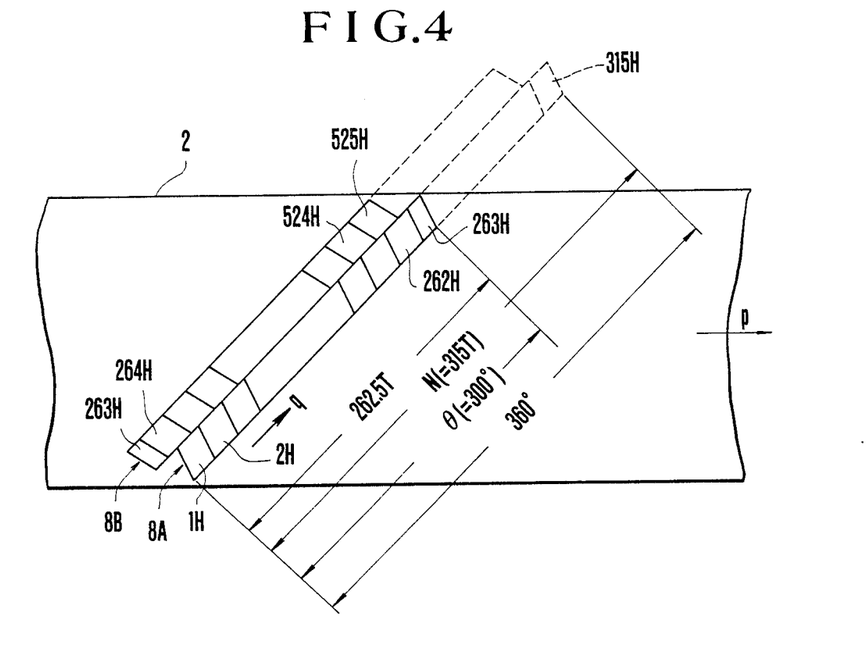
FIG. 4 is a schematic representation of a recording tape showing the video track pattern produced according to the present invention.

FIG. 4 represents a pattern formed on magnetic tape 2 when recording the two fields of one frame of a color video signal according to the present invention. Rotary head 5A is the first of the two heads to come into contact with magnetic tape 2 and records one field of the signal in video track 8A. During the time when track 8A is being formed by head 5A, no recording current is supplied to rotary head 5B. Upon the next rotation of the rotary heads, the recording current is removed from head 5A and applied to head 5B, so that the next field of the video signal is recorded as video track 8B. The 300° wrap angle results in 262.5 horizontal lines in each field, as represented by to tracks 8A and 8B. These tracks 8A and 8B are identical to the recording patterns formed by a standard video tape recorder, such as those made by the standard diameter drum and head construction shown in FIG. 3. Tracks 8A and 8B have different azimuth angles, as might be produced by heads 5A and 5B of FIG. 2, in order to prevent adjacent track crosstalk. The length of video tracks 8A and 8B, the angle of the tracks in relation to the longitudinal direction of movement of the magnetic tape 2, and the pitch of the tracks are the same as those in a standard video tape recorder. Thus, the tracks 8A and 8B appear in all outward aspects to be standard video signal tracks.

Upon inspecting the arrangement of the heads in relation to the tape wrap angle of the embodiment of FIG. 1, it will be seen that there will exist a time when both heads 5A and 5B will be in the space defined by angle $\beta$ and neither head will be in contact with magnetic tape 2. Not only can no signal be recorded during that time, but there is a finite time that will elapse before the second or following head is in position to contact the tape so as to commence recording. If the signal is fed to the second head during this period of rotary head movement, a portion of the video signal will be lost. The present invention overcomes this problem by adjusting the time base of the video signals as they are recorded.

It is necessary to record the video signals of one field, in the 525/2 horizontal intervals in the NTSC format or the 625/2 horizontal intervals of the CCIR format, in one of the video tracks 8A and 8B. In the ideal case where the magnetic tape 2 has been wrapped around the tape guide drum 1 for a complete revolution, that is, a wrap angle of 360°, and the two rotary heads both occupy the same position on the head disc (not shown), then it will be necessary to record N horizontal intervals in the NTSC format or M horizontal intervals in the CCIR format. Thus, a value of wrap angle $\theta$ must be chosen that will satisfy equations (1) and (3) above. If, for example, a wrap angle of 300° is selected, ($\theta = 300°$) then solving equations (1) and (3) it is seen that N equals 315 and M equals 375.

Referring again to FIG. 4, and, specifically, to the range of the tracks indicated by broken lines at the end of each respective track this corresponds to the ideal situation with a 360° wrap angle, but in the present case where the wrap angle is 300° this corresponds to a time when the magnetic tape 2 will not come into contact with the tape guide drum 1 and thus, no signal can be recorded by rotary heads 5A or 5B, since the tape is off the drum. When it is assumed that the magnetic tape 2 has been wrapped completely about the drum, with a wrap angle of 360°, then the signals of 315 horizontal lines will be recorded in the track 8A from the start of the track to the end of the track. Thus, lines 1H to 525H in FIG. 4 indicate the horizontal lines recorded by a standard video tape recorder with a 180° wrap angle, as well as by the present invention with a 300° wrap angle. Because FIG. 4 illustrates an example of the Beta II format, the recording location of the corresponding horizontal lines in each of tracks 8A and 8B is shifted by 0.25 horizontal time periods relative to each other.

Figure 5A:
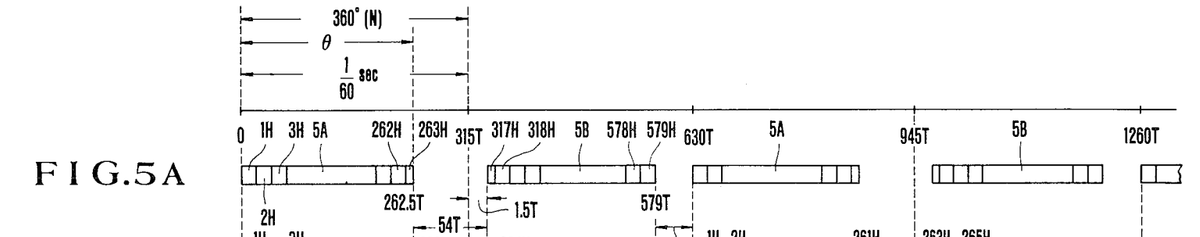
FIGS. 5A to 5D are video field and timing charts representing the operation of the present invention when the magnetic tape has a wrap angle of 300° about a reduced diameter drum.
Figure 5B:
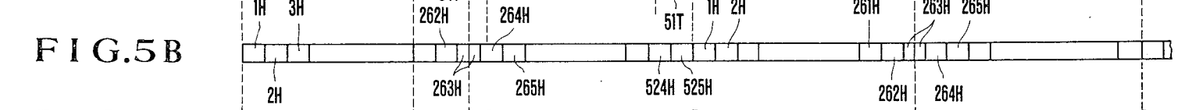
Figure 5C:
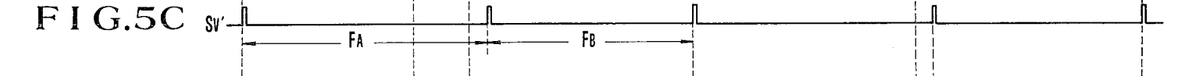

The operation of the present invention to solve the problems presented by the increased wrap angle and closely spaced heads, is set forth in relation to FIGS. 5A–5D. When recording an NTSC television signal, rotary heads 5A and 5B are rotated during one field period of time, which corresponds to 1/60 sec. FIGS. 5A–5C have a time base commencing when rotary head 5A first comes into contact with the tape at a point that corresponds to guide member 3 of the embodiment of FIG. 1. The length of the track laid down while rotary head 5A scans the tape 2 over the wrap angle $\theta$, is represented by the distance from 0 to 262.5T on the time base of FIG. 5A. After the horizontal scan line corresponding to 262.5H, the head 5A will no longer be in contact with the tape, and this is represented by space between the broken line at time 0 (262.5T) and the broken line at time 360° (N)(315T). If the rotary heads 5A and 5B could be located at the same point on the tape guide drum 1, then the recording signal corresponding to the video signal of the next field would be fed to the second head 5B starting at time 315T, since that is the start of the next field of the video signal. As stated above, rotary head 5B is by physical necessity spaced apart from head 5A by a small distance, denoted by angle $\alpha$, and will not be in a position to commence recording the next track until that distance is traversed. Accordingly, recording of the signal corresponding to the video signal of the next field can not be commenced until some time after time 315T. In this embodiment, the time delay caused by the inter-gap distance in head 5A and 5B is chosen to produce a time delay of 1.5T. After head 5B has recorded its track extending from line 317H to line 579H, rotary head 5A commences recording again from timing mark 630T and recording head 5B will subsequently commence recording after the 1.5T delay. FIG. 5A represents those horizontal scan lines that are recorded out of all possible horizontal scans that could be present if a 360° wrap angle were possible.

The start field of $F_A$, recorded by rotary head 5A, and the start of field $F_B$, recorded by rotary head 5B, are determined by pulses in vertical sync signal $S_V'$ shown in FIG. 5C. Because the track to be recorded by head 5B can not start until head 5B comes into contact with the tape, a time delay represented by 1.5T in FIG. 5A, the recording current can not be fed to head 5B until a corresponding delayed time. The commencement of recording of a respective track by heads 5A and 5B is initiated by the pulses of the vertical sync signal $S_V'$ and, therefore, the pulse that causes head 5B to being laying down the track must be delayed by a time of 1.5T from the time that it would normally occur in the ideal situation, that is, 1.5T after 315T. This will result in a series of vertical sync pulses that are periodic but unevenly spaced, so that the period of time within which field $F_A$ is described is greater by 1.5T than the period of time described by field $F_B$. The manner in which this time delay in the alternate vertical sync signal pulses is provided will be shown in detail hereinbelow.

FIG. 5B represents the video signal tracks recorded as described above, corresponding to a rotational period of 1/60 sec. of the tape guide drum 1, however, in stead of being shown in relation to all possible scan lines, the fields are represented in relation to the actual scans forming the track. Therefore, these tracks appear to be stretched-out to fill all of the available time which, as seen in FIG. 4, they actually do. These track patterns are identical to those of the standard Beta-format kind. In FIG. 5B, the recording signal indicated by the latter half of scan 263H corresponds to the signal indicated at line 317H on the ideal system time base, which is applied to magnetic head 5B, as shown in FIG. 5A. Similarly, the signal at 579H on the ideal system time base is actually recorded as the signal at scan 525H.

Figure 5D:
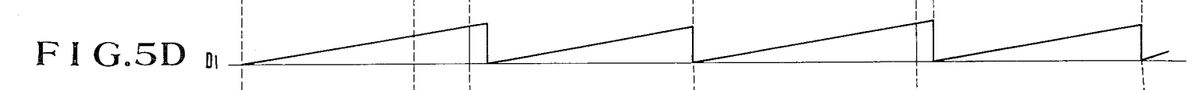

The vertical deflection current $D_I$ of the special deflection scan type camera of the present invention is shown in FIG. 5D. This vertical deflection current $D_I$ is synchronized with the vertical sync pulse $S_V'$ of FIG. 5C, alternate pulses of which are delayed in order to account for the distance between the two heads. In this embodiment of the present invention the television camera and video tape recording sub-assembly are both driven by common sync signals. The television camera may be embodied as a single-tube color television camera, in which a color separation filter is arranged on the image pickup surface of the tube or, alternatively, a solid state or CCD image sensor may be employed as the color television camera. The effective screen area of this television camera is represented at 9 in FIGS. 6A and 6B. The vertical scan of the image pickup tube is synchronized with the pulses of the vertical sync signal $S_V'$, shown in FIG. 5C, and its horizontal deflection is synchronized with the horizontal sync signal of frequency 1/T.

Figure 6A:
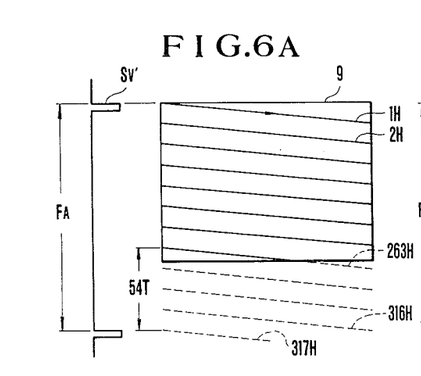
FIGS. 6A and 6B are schematic representations of the scanning operation of an image pickup portion of a video camera.
Figure 6B:
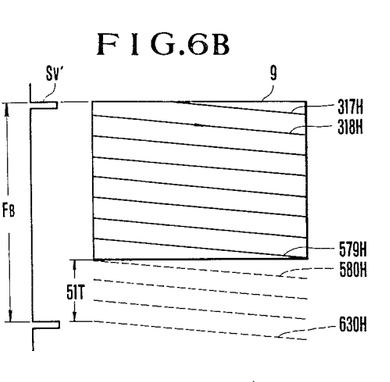

Referring then to FIG. 6A, the horizontal scan is initially performed 262.5 times in field $F_A$, all of these scans falling on the pickup surface 9 of the image sensor. Thereafter, as seen by the broken lines in FIG. 6A, 54 horizontal scans, called overscans, will fall outside of the effective screen image pickup surface 9. Similarly, in the field $F_B$ shown in FIG. 6B, the horizontal scan will start from the center of the upper-most portion of the effective screen 9 and after 262.5 lines have been finished, there will be an overscan of 51 lines, as represented by the broken lines at the bottom of screen 9. Upon reaching the last scan line, as represented at the broken scan line 630H in FIG. 6B, the scan for the next frame will immediately commence at the upper left-hand corner of screen 9, as shown in FIG. 6A. FIGS. 6A and 6B represent the effective screen of the image pickup device, and it will be understood that the interlaced scanning, as represented in these two figures, is performed at the image pickup tube or at the solid state imaging device forming the video camera. In FIGS. 6A and 6B, the scanning lines 1H to 630H are shown in correspondence with the deflection sync signals $S_V'$. By adjusting the occurrence of the pulses in these deflection sync signals, the pattern of lines overlaying the effective screen 9 of the image pickup device can be altered. Comparing FIGS. 6A and 6B with FIG. 5A, it is seen that by judiciously choosing the times of occurrence of the vertical sync pulses the overscan in each pickup scan can be made to occur during the times when the two heads 5A and 5B are off the tape, thus, no information will be lost.

Figure 7A:
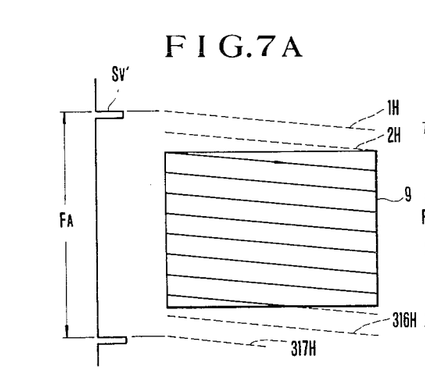
FIGS. 7A and 7B are schematic representations of the scanning operation of an image pickup portion of a video camera according to the present invention.
Figure 7B:
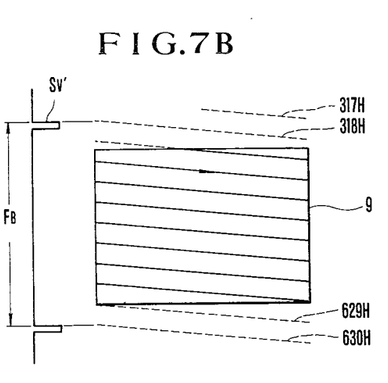

A deflecting apparatus (not shown) could be easily implemented to distribute the overscanning portions of the screen, by arranging the overscan to be partially above and below the effective screen area 9 of the image pickup device, as shown in FIGS. 7A and 7B. This repositioning of the scan could be easily accomplished by adjusting the timing of the sync pulses $S_V'$ relative to the commencement of each field.

Figure 8A:
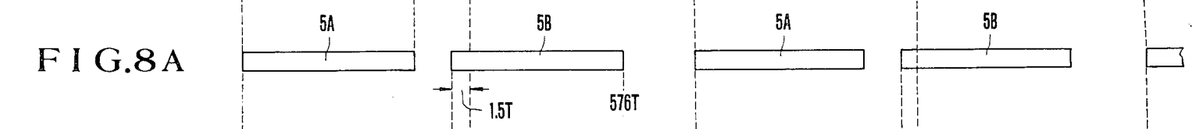
FIGS. 8A and 8B are video field and timing charts describing the operation of a embodiment of the present invention when the tape has a wrap angle of 300° about a reduced diameter drum and the second of the two rotary heads is arranged ahead of the first.
Figure 8B:
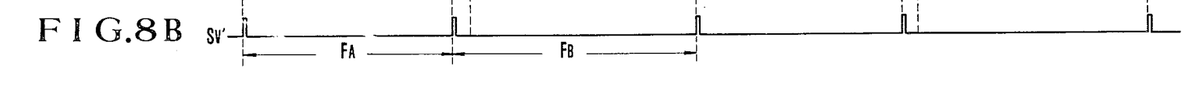

In the preceding example, the head used to record the second field $F_B$ was arranged to follow the head used to record the first field $F_A$. In an alternate embodiment rotary head 5B is separated from rotary head 5A by a distance represented by angle $\alpha$ but is arranged ahead of or in front of head 5A. This means that the recording made by rotary head 5B for the time period 262.5T is advanced by a time 1.5T from the time when the recording by head 5B should start based upon the time base of FIG. 5A. The recording tracks produced heads 5A and 5B in this embodiment are represented in FIG. 8A, which is on the same time base as the FIGS. 5A–5C. In order to accomplish this, the vertical sync pulses are adjusted as shown in FIG. 8B, the vertical deflection at the image pickup tube is accomplished in synchronism with this vertical sync signal $S_V'$.

When the color video signals are in the CCIR format, in which the vertical frequency is 1/50 sec. and the number of horizontal scan lines is 625, the same approach outlined above relative to the NTSC format is followed. For example, in the case (not shown) where the signal to the rotary head 5B is delayed by a time 1.5T relative to rotary head 5A, in which T is specified by the horizontal frequency of the CCIR format, the signal of one field is recorded by rotary head 5A during the time period from 0 to 312.5T, and the signal of the other field is recorded by rotary head 5B starting at the time of 312.5T, corresponding to line 375T+1.5T.

The present invention is not restricted to using a wrap angle of 300° as discussed hereinabove and, for example, the wrap angle $\theta$ of magnetic tape 2 around drum 1 can be 310.34°, and in such case N'+0.5=304.5° and M'+0.5=362.5°. Thus, since the values of N'+0.5 and M'+0.5 have the fractional value 0.5, the angular distance between the gaps of rotary heads 5A and 5B must be selected to cause a time difference of mT, where m is an integer. For example, one advantageous time difference has been found to be 1T.

Figure 9A:
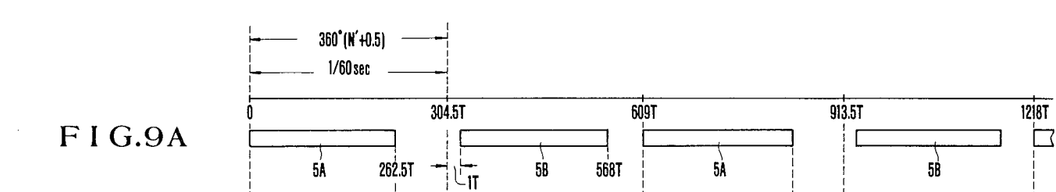
FIGS. 9A and 9B are video field and timing charts representing the operation of the present invention when the tape has a wrap angle of 310.34° about a reduced diameter drum.

FIG. 9A is a representation of the timing relationships between the tracks laid down by the respective heads as controlled by the vertical sync signal, when the wrap angle of the tape about the drum is equal to 310.34°, and when rotary head 5B is attached in relation to rotary head 5A to require a delay of 1T between the commencement of the recording signals to the respective heads. It will be recalled from the above that the values of T and the wrap angle $\theta$ are interdependent and, thus, in an embodiment wherein the wrap angle $\theta$=310.34°, the value of T will change accordingly. As seen in FIG. 9A, the color video signal of one field, as produced by the television camera, will be supplied to rotary head 5A and ultimately recorded on magnetic tape 2 during the time period 0 to 262.5T on the time base of FIG. 9A. The recording signal corresponding to the color video signal of field $F_B$ from the television camera is then recorded by rotary head 5B on magnetic tape 2 during a time period of 262.5T, on the time base of FIG. 9A. As seen in FIG. 9A, the commencement of the recording of frame $F_B$ is delayed by 1T from the next field timing mark 304.5T, which occurs after a lapse of 1/60 sec, and this track extends to line 568T on the time base of FIG. 9A. The vertical or deflection sync signal $S_V'$ relative to the time of commencement of the recording of these tracks for frame $F_A$ and $F_B$ is seen in FIG. 9B.

Figures 9B, 10A:
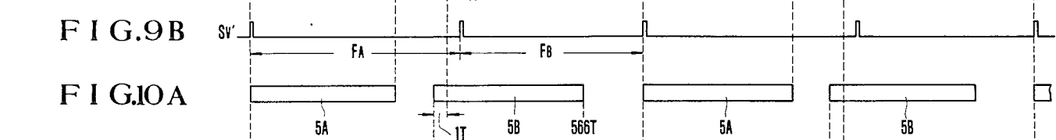
FIGS. 10A and 10B are video fields and timing charts representing the operation of an embodiment of the present invention when the tape has a wrap angle of 310.34° about a reduced diameter drum and the second of the two rotary heads is arranged ahead of the first head.
Figure 10B:
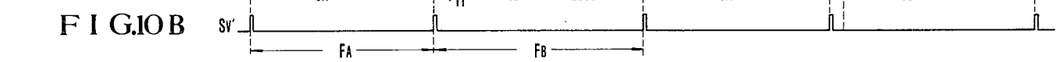

In the alternative embodiment in which the commencment of the track put down by rotary head 5B should be advanced by a time difference of 1T in relation to the track of rotary head 5A because rotary head 5B is in front of rotary head 5A, then the recording signal supplied to rotary head 5B will be early by a time of 1T in relation to the time when it would normally be put down, as shown in FIG. 10A. The occurrence of the pulses in the vertical sync signal $S_V'$ to accomplish this is shown in FIG. 10B and, accordingly, in recording the color video signal in the CCIR format when the wrap angle is equal to 310.34°, the timing involved in supplying the recording signal to rotary head 5B may be shifted by only 1T, in the same fashion as the recording of the color video signal of the NTSC format, as described hereinabove.

Figure 11:
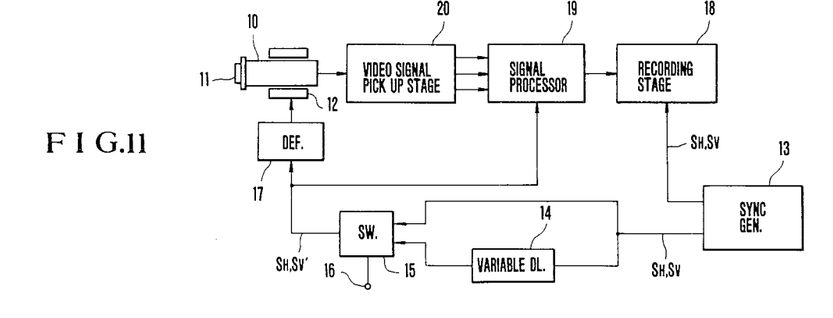
FIG. 11 is a block diagram of a video signal recording system including a camera according to the present invention.

FIG. 11 is a block diagram of an embodiment of a video camera and recording apparatus according to the present invention, in which image pickup tube 10 is provided having a color separation filter 11 arranged on the image pickup surface and employing electro-magnetic or electro-static deflection apparatus 12 to accomplish the required scanning. Alternatively, a solid-state image sensor of the CCD kind could be advantageously employed. A sync signal generator 13 is provided to generate the vertical sync signal $S_V$ and the horizontal sync signal $S_H$. The horizontal sync signal must have a frequency $f_H'$ that is higher by a ratio of 360°/$\theta$ in relation to the normal horizontal sync frequency. The sync signals from the sync signal generator 13 are fed through variable delay circuit 14 for imparting a selectable time delay to the vertical sync pulses before being fed to switch 15. The sync signals from the sync generator 13 are also fed directly to switch 15, with no time delay being imparted. The variable delay circuit 14 is constructed to impart a selected delay around a center delay time and, based upon the timing relationships as demonstrated in FIG. 5A hereinabove, the sync signal corresponds to 315T as one field and, thus, would be the signal generated by sync signal generator 13, and the variable delay circuit 14 should have a delay with a center value of 1.5T, that is, a delay of plus-or-minus 1.5T.

Switch 15 alternately selects as outputs either of the sync signals $S_V$ and $S_H$ from the sync signal generator 13 or the sync signals $S_V'$ and $S_H$ that have been fed through the variable delay circuit 14 for delaying alternate ones of the vertical sync pulses, in response to a control pulse of 1/60 sec. that is applied at terminal 16. This control pulse applied to terminal 16 of switch 15 provides the change-over timing and is advantageously positioned in time around the mid-point in the time during which the rotary head 5A does not come into contact with magnetic tape 2. This control pulse can be easily produced or derived from the sync signals produced by sync signal generator 13. The output sync signals, for example, $S_V'$ and $S_H$, from switch 15 are fed to the deflection circuit 17 employed with image pickup tube 10, and the output sync signals from switch 15 are also fed to a signal processor 19. The vertical sync signal $S_V'$ is substantially identical to that shown in FIG. 5C. Image pickup tube 10 carries out the interlace scanning in accordance with the above description relative to FIGS. 6A and 6B. A recording stage 18 comprises the mechanical portion that includes the rotary heads and servo circuits and uses the vertical sync signal $S_V$ having the evenly spaced periodic pulses from sync signal generator 13 as a reference for the servo mechanism. The servo circuit controls the rotational phases of rotary heads 5A and 5B so that the respective rotational phases thereof and phase of the vertical sync signal maintain a predetermined relationship. The output signal of the image pickup tube 10 is fed through a video signal pickup stage circuit 20 to the signal processor 19, where the signals are processed to derive the control signals and recording signals fed to the recording stage 18. For example, the luminance signal component is FM modulated, and the carrier color signal component is low-frequency converted and then processed to alternately repeat, at every horizontal period, the field in which the phase of the color carrier is inverted and the field in which this phase inversion is not performed, thereby producing the recording signal for a so-called Beta-format VTR. In place of this phase inversion processing, the recording signal can be produced using phase shift processing in which the phase of the carrier signal is changed by 90° at every horizontal period, with the direction of this phase change being reversed in adjacent fields.

Figure 12:
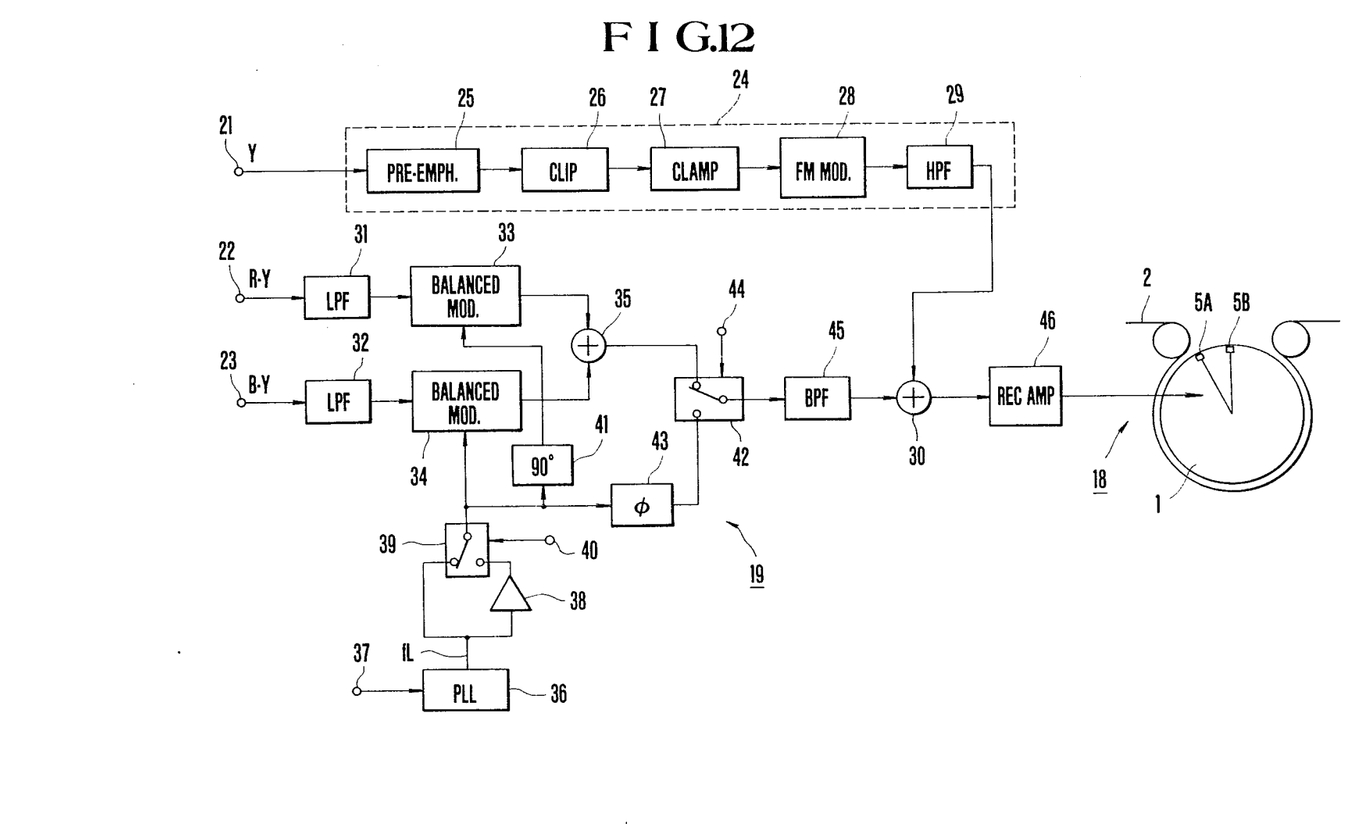
FIG. 12 is a block diagram of a signal processor suitable for use in the video signal recording system of FIG. 11.

FIG. 12 is a block diagram of an embodiment of a signal processor 19 advantageous for use in forming a recording signal for a Beta-format VTR. The composite sync signal fed through variable delay circuit 14 is fed to signal processor 19, and a luminance signal Y (to which the composite sync signal has been added) is fed from the video signal pickup stage 20 to an input terminal 21, and color difference signals $R-Y$ and $B-Y$ are supplied to input terminals 22 and 23, respectively, from the video signal pickup stage 20. The recording signal formed by the signal processor 19 is ultimately fed to rotary heads 5A and 5B through a recording amplifier 46, a recording switch (not shown), and a rotary transformer (not shown) that are included in the recording stage 18 for recording the video signal on magnetic tape 2. The luminance signal Y, derived from the video signal pickup stage, is fed in at terminal 21 to a luminance signal recording circuit 24, which includes pre-emphasis circuit 25, clipping circuit 26, clamp circuit 27, FM modulator 28, and high-pass filter 29. A modulated luminance signal, produced at the output of high-pass filter 29, has been FM modulated so that the sync clip level and white peak assume predetermined frequencies, respectively, and is fed to mixer 30.

The color difference signals $R-Y$ applied at terminal 22 and $B-Y$ applied at terminal 23 are fed through low-pass filters 31 and 32 to balanced modulators 33 and 34, respectively. The output signals from balanced modulators 33 and 34 are then both fed to a signal mixer 35 where they are combined. A phase-locked-loop (PLL) circuit 36 produces a carrier signal having a frequency $f_L$ that may have a value of, for example, $(175/4) F_H'$, which is approximately 688 kHz, based on a horizontal sync signal applied at terminal 37. The output signal $f_L$ of phase-locked-loop circuit 36 is fed to phase invertor 38 whose output signal is fed to one input of selector switch circuit 39, and the output signal from phase-locked-loop circuit 36 is also fed directly to another input terminal of selector switch circuit 39. The operation of selector switch circuit 39 is controlled by switch pulses applied at terminal 40. These switch pulses have a constant level during the period of field $F_A$, in which the recording signal is fed only to rotary head 5A, and the level of the pulses is then inverted every 1T time period during the period of field $F_B$, in which the recording signal is fed only to rotary head 5B. Accordingly, the phase of the carrier signal is constant during the field $F_A$ and the phase is inverted every 1T time period during the field $F_B$. Such phase control of the carrier permits the elimination of crosstalk with respect to color signals from adjacent tracks, by means of a comb filter contained within the reproducing circuit. The switching pulses applied at terminal 40 can be easily derived by one skilled in the art from the vertical and horizontal sync signals generated by sync signal generator 13.

The carrier signal from switching circuit 39 is fed to a first balanced modulator 34 and also to a 90° phase shifter 41, whose output is fed to a second balanced modulator 33. Note that 90° phase shifter 41 forms the color carrier signal for the quadrature modulation. The output of mixer 35 is fed to one input of selector switch circuit 42, and the other input to selector switching circuit 42 is a burst signal derived from the carrier signal that has a predetermined phase due to effects of phase shifter 43. The selector switch circuit 42 is controlled by switching pulses applied at terminal 44, and the signal to which the burst signal was added appears as an output signal of switching circuit 42, which is fed to bandpass filter 45. Thus, the color signal that has been converted to a low-band carrier frequency, including this burst signal, is then passed through bandpass filter 45 to mixer 30, where it is added to the modulated luminance signal, as derived above. The recording signal formed by signal processor 19 is fed through recording amplifier 46 and is recorded on the magnetic tape by the reduced diameter tape guide drum and the closely arranged rotary heads 5A and 5B. The present invention provides specifically that this recorded signal can be played back by a standard video tape recorder, which has two rotary heads 7A and 7B, as shown in FIG. 3, spaced apart by 180°.

Upon such playback, the crosstalk of the luminance signal component between adjacent tracks is supressed, and the color signal of the reproduced low-band carrier frequency is frequency converted into a signal having a standard color subcarrier frequency $f_{SC}$ in the NTSC format and is ultimately fed through a comb filter, which eliminates crosstalk of the color signals between adjacent tracks. More specifically, the comb filter is formed so that subtraction is carried out between the signal that was delayed by 1H and the signal that was not delayed, and crosstalk is eliminated using the phase of the reproduction signals from one track from the adjacent tracks that has been inverted at every horizontal interval and the phase of the reproduction signal from the other track that has not been inverted.

By means of the variable delay circuit 14 any error existing in the gap distance G, as shown in FIG. 2, between rotary heads 5A and 5B may be compensated. It should be noted that even though rotary heads 5A and 5B can be formed by adhering one to the other to form a unitary element, if the gap distance G is beyond the normal dimensional tolerances so as to cause a time difference beyond 1.5T or 1T it will be impossible to mechanically adjust such misalignment and, thus, electrical compensation is provided by the variable delay circuit 14. To record television signals of standard frequencies from a television tuner using the embodiment of the present invention as described above, the television signals may be time compressed using known circuits in order to keep the horizontal and vertical syncronous relationship with the input signal from the image pickup tube 10, thereby providing signals similar to those described in relation to FIG. 5A.

Although an illustrated embodiment of the present invention has been described in detail above with reference to the accompanying drawing it is to be understood that the invention is not limited to those precise embodiments, and that many varies changes and modifications can be effected therein by one skilled in the art without departing from the spirited scope of the invention, as defined by the appended claims.

What is claimed is:

1. A video signal recording apparatus for recording a video signal in a plurality of tracks extending obliquely on a magnetic tape, the video signal being composed of successive frames with each frame having a plurality of fields, comprising:

means for producing horizontal and vertical synchronization signals, in which the relative times of occurrence of pulses in said vertical synchronization signal are controlled relative to selected fields of said video signal, said pulses being periodic and unequally spaced;

recording means including a tape guide drum having said magnetic tape arranged there around with a wrap angle $\theta$, means for controlling the extent of the wrap angle of said magnetic tape around said tape guide drum so that $360°/\theta \times 525/2 = N$, wherein N is a positive, nonzero integer, first and second rotary heads adapted to come into contact with said magnetic tape and connected to receive said video signals for selectively recording said video signals on said magnetic tape in response to said pulses of said vertical synchronization signal, and means for mounting said first and second rotary heads so that a distance between said first and second rotary heads corresponds to a time difference of $(m+0.5)T$ between the time said first rotary head ceases contact with said magnetic tape and said second rotary head commences contact with said magnetic tape, where m is an integer and T is a time corresponding to one horizontal period, whereby the initial times at which said first and second rotary heads apply said fields of said video signal to said magnetic tape are synchronized with said pulses in said vertical synchronization signal.

2. A video signal recording apparatus according to claim 1, in which said wrap angle $\theta = 300°$, $N = 315°$, and $m = 1$.

3. A video signal recording apparatus according to claim 1, in which said means for producing horizontal and vertical synchronization signals includes a variable time delay means for delaying alternate pulses of said vertical synchronization signal by said time difference of $(m+0.5)T$.

4. A video signal recording apparatus according to claim 1, in which gaps in said first and second heads, extend respectively in directions different from each other.

5. A video signal recording apparatus for recording an NTSC video signal in a plurality of tracks extending obliquely on a magnetic tape, the NTSC video signal being composed of successive frames with each frame having a plurality of fileds, comprising:

means for producing horizontal and vertical synchronization signals, in which the relative times of occurrence of pulses in said vertical synchronization signal are controlled relative to selected fields of said video signal, said pulses being periodic and unequally spaced;

recording means including a tape guide drum having said magnetic tape arranged there around with a wrap angle $\theta$, means for controlling the extent of wrap angle of said magnetic tape around said tape guide drum so that $360°/\theta \times 525/2 = N' + 0.5$, wherein N' is a positive, nonzero integer, first and second rotary heads adapted to come into contact with said magnetic tape and connected to receive said video signals for selectively recording said video signals on said magnetic tape in response to said pulses of said vertical synchronization signal, and means for mounting said heads so that a distance between said first and second rotary heads corresponds to a time difference of mT between the time said first rotary head ceases contact with said magnetic tape and the time said second rotary head commences contact with said magnetic tape, where m is an integer and T is a time corresponding to one horizontal period.

6. A video signal recording apparatus according to claim 5, in which said means for producing horizontal and vertical synchronization signals includes a variable time delay means for delaying alternate pulses of said vertical synchronization signal by said time difference of mT.

7. A video signal recording apparatus according to claim 5, in which $O = 310.34°$, $N' + 0.5 = 304.5$ and $m = 1$.

8. A video signal recording apparatus according to claim 5, in which said means for producing horizontal and vertical synchronization signals includes time delay means for imparting a selected time delay to alternate ones of said pulses in said vertical synchronization signal.

9. A video signal recording apparatus for recording a video signal in a plurality of tracks extending obliquely on a magnetic tape in which each track corresponds to one of two fields making up a video signal frame, comprising:

video camera means having an image pickup portion for producing a video signal to be recorded in said plurality of tracks on said magnetic tape;

sync generator means integrally formed with said video camera means for producing horizontal and vertical synchronization signals in which pulses in said vertical synchronization signal occur at selected times, said pulses being periodic and unevenly spaced, said horizontal and vertical synchronization signal being fed to said video camera for synchronizing the scanning of said image pickup portion;

recording means integrally formed with said video camera means and said sync generator means and including a tape guide drum having said magnetic tape wrapped around with a wrap angle $\theta$, means for controlling the extent of wrap angle of said magnetic tape around said tape guide drum so that $360°/\theta \times 525/2 = N$, wherein N is a positive, nonzero integer, first and second rotary magnetic recording heads arranged in spaced-apart relationship by a distance determined by an angle $\alpha$ that is less than 180° and being adapted to come into contact with said magnetic tape, and means for mounting said first and second magnetic recording heads so that said angle between said first and second rotary magnetic recording heads corresponds to a time difference of $(m+0.05)T$ between the time said first rotary head ceases contact with said magnetic tape and said second rotary head commences contact with said magnetic tape, where m is an integer and T is a time corresponding to one horizontal period, said first and second rotary magnetic recording heads being connected to receive said video signal from said video camera means for recording said fields of said video signals in said tracks on said magnetic tape commencing at times determined by said pulses in said vertical synchronization signal.

10. A video signal recording apparatus according to claim 9, in which said video camera means is a color video camera and includes a video signal processor for processing color video signals produced by said scanning of said image pickup portion into composite luminance and chrominance signals.

11. A video signal recording apparatus according to claim 10, in which said signal processing means includes means for producing a carrier signal having a low-band frequency and being phase controlled to prevent interference between adjacent tracks, means for producing a balanced modulated color signal on said carrier signal, and means for FM modulating a luminance signal, said video signal being formed by adding said balanced modulated color signal and said FM modulated luminance signal in a mixer means.

12. A video signal recording apparatus according to claim 9, in which said wrap angle $\theta = 300°$; N = 315°; and $\alpha = 1.5T$.

13. A video signal recording apparatus according to claim 9, in which said means for producing horizontal and vertical synchronization signals includes a variable time delay means for delaying alternate pulses of said vertical synchronization signal by said time difference of $(m+0.5)T$.

14. A video signal recording apparatus according to claim 9, in which said tape guide drum is of a diameter substantially less than a diameter of a corresponding tape guide drum of a video signal recorder having a wrap angle substantially equal to 180° and in which the rotary heads are separated by 180°.

15. A video signal recording apparatus according to claim 9, in which gaps in said first and second rotary heads extend, respectively, in directions different from each other.

16. A video signal recording apparatus according to claim 9, in which $\theta = 310.34°$; $N' + 0.5 = 304.5$; and m = 1.

17. A video signal recording apparatus according to claim 9, in which said means for producing horizontal and vertical synchronization signals includes a variable time delay means for delaying alternate pulses of said vertical synchronization signal by said time difference of mT.

18. A video signal recording apparatus according to claim 9, in which said means for producing horizontal and vertical synchronization signals includes time delay means for imparting a selected time delay to alternate ones of said pulses said vertical synchronization signal.

19. A video signal recording apparatus for recording a video signal in a plurality of tracks extending obliquely on a magnetic tape, in which each track corresponds to one of two fields making up a video signal frame, comprising:

video camera means having an image pickup portion for producing a video signal to be recorded in said plurality of tracks on said magnetic tape;

sync generator means integrally formed with said video camera means for producing horizontal and vertical synchronization signals in which pulses in said vertical synchronization signal occur at selected times, said pulses being periodic and unevenly spaced, said horizontal and vertical synchronization signals being fed to said video camera for synchronization the scanning of said image pickup portion; and recording means integrally formed with said video camera means and said sync generator means and including a tape guide drum having said magnetic tape wrapped there around with a wrap angle $\theta$, means for controlling the extend of the wrap angle of said magnetic tape around said tape guide drum so that $360°/\theta \times 525/2 = N$, wherein N is a positive, nonzero integer, first and second rotary magnetic recording heads arranged in spaced-apart relationship by a distance determined by an angle $\alpha$ that is less than 180° and being adapted to come into contact with said magnetic tape, and means for mounting said first and second magnetic recording heads so that said angle between said first and second rotary magnetic recording heads corresponds to a time difference of $(m+0.05)T$ between the time said first rotary head cases contact with said magnetic tape and said second rotary head commences contact with said magnetic tape, where m is an integer and T is a time corresponding to one horizontal period, said first and second rotary magnetic recording heads being connected to receive said video signal from said video camera means for recording said fields of said video signals in said tracks on said magnetic tape commencing at times determined by said pulses in said vertical synchronization signal.

20. A video signal recording apparatus according to claim 19, in which said video camera means is a color video camera and includes a video signal processor for processing color video signals produced by said scanning of said image pickup portion into composite luminance and chrominance signals.

21. A video signal recording apparatus according to claim 20, in which said signal processing means includes means for producing a carrier signal having a low-band frequency and being phase controlled to prevent interference between adjacent tracks, means for producing a balanced modulated color signal on said carrier signal, and means for FM modulating a luminance signal, said video signal being formed by adding said balanced modulated color signal and said FM modulated luminance signal in a mixer.

22. A video signal recording apparatus according to claim 19, in which said wrap angle $\theta = 300°$; N = 315°; and $\alpha = 1.5T$.

23. A video signal recording apparatus according to claim 19, in which said means for producing horizontal and vertical synchronization signals includes a variable time delay means for delaying alternate pulses of said vertical synchronization signal by said time difference of $(m+0.5)T$.

24. A video signal recording apparatus according to claim 19, in which said tape guide drum is of a diameter substantially less than a diameter of a corresponding tape guide drum of a video signal recorder having a wrap angle substantially equal to 180° and in which the rotary heads are separated by 180°.

25. A video signal recording apparatus according to claim 19, in which gaps in said first and second rotary heads extend, respectively, in directions different from each other.

26. A video signal recording apparatus according to claim 19, in which $\theta=310.34°$; $N'+0.5=304.5$; and $m=1$.

27. A video signal recording apparatus according to claim 19, in which said means for producing horizontal and vertical synchronization signals includes a variable time delay means for delaying alternate pulses of said vertical synchronization signal by said time difference of $mT$.

28. A video signal recording apparatus according to claim 19, in which said means for producing horizontal and vertical synchronization signals includes time delay means for imparting a selected time delay to alternate ones of said pulses said vertical synchronization signal.

* * * * *